US008961018B2

(12) United States Patent
Kawashima et al.

(10) Patent No.: US 8,961,018 B2
(45) Date of Patent: Feb. 24, 2015

(54) CONNECTING ROD BEARING

(71) Applicant: Daido Metal Company Ltd., Nagoya (JP)

(72) Inventors: Yuki Kawashima, Inuyama (JP); Motohiko Koushima, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 13/971,108

(22) Filed: Aug. 20, 2013

(65) Prior Publication Data

US 2014/0064644 A1    Mar. 6, 2014

(30) Foreign Application Priority Data

Aug. 31, 2012 (JP) ................. 2012-191271

(51) Int. Cl.
*F16C 3/14* (2006.01)
*F16C 9/04* (2006.01)
*F16C 33/10* (2006.01)
(Continued)

(52) U.S. Cl.
CPC ... *F16C 3/14* (2013.01); *F16C 9/04* (2013.01); *F16C 33/046* (2013.01); *F16C 33/1055* (2013.01); *F16C 33/1065* (2013.01); *F16C 17/022* (2013.01); *F16C 2240/42* (2013.01); *F16C 2240/54* (2013.01)
USPC ........... 384/288; 384/291; 384/397; 384/392; 384/430

(58) Field of Classification Search
CPC ............ F16C 3/14; F16C 9/04; F16C 17/022; F16C 33/046; F16C 33/103; F16C 33/1055; F16C 33/1065; F16C 2240/42; F16C 2240/54

USPC ......... 384/273, 283, 285, 288, 290–291, 294, 384/397, 430; 123/196, 197.3–197.4
See application file for complete search history.

(56) References Cited

U.S. PATENT DOCUMENTS 4,461,585 A * 7/1984 Mahrus et al. ................ 384/288
6,082,904 A * 7/2000 Ono et al. ..................... 384/291
(Continued)

FOREIGN PATENT DOCUMENTS

DE 102007046010     4/2008
DE 102008063760 A1 * 8/2009
(Continued)

OTHER PUBLICATIONS

European Search Report dated Nov. 7, 2013 from corresponding European patent application Serial No. EP 13181012.9 (seven pages).

*Primary Examiner* — Marcus Charles
(74) *Attorney, Agent, or Firm* — Harness, Dickey & Pierce, P.L.C.

(57) ABSTRACT

A connecting rod bearing fort supporting a crankpin of an internal combustion engine is provided. The crankpin has a discharge port on its surface for supplying lubrication oil to a gap between the crankpin and the connecting rod bearing constituted by a pair of half bearings. The half bearing includes a main cylindrical portion, crush reliefs and transitional regions. A plurality of crush relief grooves are formed in the crush relief to continuously extend in a circumferential direction, and an axial groove is formed at an inner side end edge of the half bearing in the circumferential direction to continuously extend in an axial direction so that the crush relief grooves communicate with the axial groove.

8 Claims, 7 Drawing Sheets

(51) Int. Cl.
*F16C 33/04* (2006.01)
*F16C 17/02* (2006.01)

(56) References Cited

U.S. PATENT DOCUMENTS

| | | | | |
|---|---|---|---|---|
| 6,089,756 | A * | 7/2000 | Ono et al. | 384/291 |
| RE39,613 | E * | 5/2007 | Niwa et al. | 384/294 |
| 7,234,870 | B2 * | 6/2007 | Kitahara et al. | 384/288 |
| 8,147,144 | B2 * | 4/2012 | Ishigo et al. | 384/288 |
| 8,317,402 | B2 * | 11/2012 | Ishigo et al. | 384/288 |
| 2005/0263125 | A1* | 12/2005 | Terada et al. | 384/288 |
| 2010/0046869 | A1* | 2/2010 | Matsuyama | 384/288 |
| 2011/0058761 | A1 | 3/2011 | Ishigo et al. | |
| 2011/0058762 | A1* | 3/2011 | Ishigo et al. | 384/430 |
| 2011/0305410 | A1* | 12/2011 | Otsuki et al. | 384/397 |
| 2012/0304957 | A1* | 12/2012 | Watanabe | 123/196 R |

FOREIGN PATENT DOCUMENTS

| | | | | |
|---|---|---|---|---|
| DE | 102010022511 A1 * | 8/2011 | | |
| DE | 102012215816 A1 * | 3/2013 | | |
| DE | 102012215822 A1 * | 3/2013 | | |
| JP | 04-219521 | 8/1992 | | |
| JP | 08-277831 | 10/1996 | | |
| JP | 2002-188624 | 7/2002 | | |
| JP | 2004019682 A * | 1/2004 | | F16C 9/04 |
| JP | 2005069283 | 3/2005 | | |
| JP | 2010121719 A * | 6/2010 | | |
| JP | 2010285966 A * | 12/2010 | | |
| JP | 2011-058568 | 3/2011 | | |
| WO | WO 2011104940 A1 * | 9/2011 | | |

* cited by examiner

CONNECTING ROD BEARING

BACKGROUND OF THE INVENTION (1) Field of the Invention

The present invention relates to a connecting rod bearing for an internal combustion engine that is configured so that lubrication oil supplied to an inner circumferential surface of a main bearing supporting a crankshaft is supplied to an inner circumferential surface of a connecting rod bearing supporting a crankpin through an internal lubrication oil path of the crankshaft.

(2) Description of Related Art

A crankshaft of an internal combustion engine is supported at a journal section thereof in a cylinder block lower portion of the internal combustion engine via a main bearing constituted by a pair of half bearings. For the main bearing, lubrication oil which is discharged by an oil pump through a through-hole formed in a wall of the main bearing from an oil gallery formed in a cylinder block wall is fed into a lubrication oil groove formed along an inner circumferential surface of the main bearing. Further, a first lubrication oil path is formed to penetrate the journal section in a diameter direction thereof, so that both end openings of the first lubrication oil path communicate with the lubrication oil groove of the main bearing. Further, a second lubrication oil path passing through a crank arm section is formed to branch from the first lubrication oil path of the journal section, and the second lubrication oil path communicates with a third lubrication oil path formed to penetrate a crankpin in a diameter direction thereof. The lubrication oil fed into the lubrication oil groove formed in the inner circumferential surface of the main bearing through the through-hole from the oil gallery in the cylinder block wall in this manner passes through the first lubrication oil path, the second lubrication oil path and the third lubrication oil path, and is supplied from a discharge port opened at a tail end of the third lubrication oil path to a gap between sliding surfaces of the crankpin and the connecting rod bearing (for example, see JP-A-08-277831).

The lubrication oil fed to the connecting rod bearing through the journal section of the crankshaft from the cylinder block of the internal combustion engine is likely to be accompanied by foreign matters existing in the lubrication oil paths of respective sections. The foreign matters may damage the sliding surface of the connecting rod bearing, if the foreign matters accompany the lubrication oil and are fed to the gap between the sliding surfaces of the crankpin and the connecting rod bearing. Accordingly, the foreign matters entering the gap between the sliding surfaces of the crankpin and the connecting rod bearing need to be quickly discharged to an outside from a sliding surface portion.

Conventionally, as a main bearing and a connecting rod bearing, sliding bearings each composed of a pair of half bearings have been adopted. In the sliding bearing, so-called crush reliefs are formed adjacently to contact surfaces of the half bearings.

A crush relief is a wall thickness-reduced region, which is formed so that a wall thickness of a region adjacent to a circumferential end surface of the half bearing decreases toward the circumferential end surface. The crush reliefs are formed with the objective of absorbing positional displacement and deformation of butting surfaces of the half bearings when the pair of half bearings are assembled (for example, see JP-A-04-219521).

Meanwhile, in recent years, in response to miniaturization of the oil pump for supplying lubrication oil, a bearing has been proposed, in which circumferential grooves are formed on inner circumferential surfaces of circumferential end portions of the bearing by boring, in order to decrease the amount of leakage of the lubrication oil from a bearing end portion (for example, see JP-A-2002-188624).

Furthermore, as a measure dealing with the foreign matters mixed into the lubrication oil, there is the proposal to provide a lubrication oil groove in a circumferential direction throughout the entire length of an inner circumferential surface of a semicircular bearing of the main bearing composed of a pair of half bearings, which semicircular bearing has a through-hole directly receiving supply of the lubrication oil from an oil gallery in a cylinder block wall, and to form gaps in circumferential end portions of the inner circumferential surface, whereby the foreign matters accompanying the lubrication oil and entering the lubrication oil groove are discharged so as to be dispersed into the plurality of circumferential grooves in the circumferential end portions of the inner circumferential surface of the semi-cylindrical bearing, and further are discharged to an outside of the bearing through an axial groove formed on inner circumferential surfaces of butting portions of the circumferential end surfaces of a pair of semi-cylindrical bearings (for example, see JP-A-2011-58568).

It was confirmed that when the above idea is applied to a connecting rod bearing, the effect of discharging the foreign matters cannot be obtained, and in addition, the foreign matters remain in the circumferential lubrication oil groove formed throughout the entire length of the inner circumferential surface of one of the half bearings for the connecting rod. Further, it was also confirmed by a test that the foreign matters are dispersed throughout the entire bearing sliding surfaces, so that damage to the bearing easily occurs, and therefore, the idea has the opposite effect to what was expected.

This is because in general, a housing holding a connecting rod bearing deforms significantly during operation of an internal combustion engine, and a gap between a crankpin section and a connecting rod bearing is larger than a gap between a journal section and a main bearing, as a result of which, the foreign matters held in the lubrication oil groove easily spread to the entire bearing sliding surfaces, the foreign matters are also distributed to the sliding surface portions in the "circumferential central portion of a half bearing" which is a main load portion, and the bearing damage increases more than the case of using the connecting rod bearing of the conventional type which is not provided with a circumferential lubrication oil groove.

BRIEF SUMMARY OF THE INVENTION

Consequently, an object of the present invention is to provide a connecting rod bearing excellent in dischargeability of foreign matters included in lubrication oil while suppressing a leakage amount of the lubrication oil.

In order to attain the above-described object, a connecting rod bearing of the present invention is a connecting rod bearing which supports a crankpin of an internal combustion engine. In the crankpin, a discharge port for supplying lubrication oil to a gap between the crankpin and the connecting rod bearing is formed, and the connecting rod bearing is constituted by a pair of half bearings. Further, the half bearing includes a main cylindrical portion formed to include a central portion in a circumferential direction of the half bearing, crush reliefs formed in both end portions in the circumferential direction of the half bearing so that wall thicknesses thereof are smaller than a wall thickness of the main cylindrical portion, and a transitional region formed between at least the crush relief on a front side in a rotational direction of the crankpin and the main cylindrical portion so that a wall thickness thereof decreases toward the crush relief. In the crush relief, a plurality of crush relief grooves continuously extending in the circumferential direction are formed, while an axial groove continuously extending in an axial direction is formed at an inner side end edge in the circumferential direction of the half bearing, so that the crush relief grooves communicate with the axial groove.

The pair of half bearings constituting the connecting rod bearing of the present invention has the main cylindrical portion, the crush reliefs and the transitional regions. In the crush relief, a plurality of crush relief grooves continuously extending in the circumferential direction are formed, while the axial groove continuously extending in the axial direction is formed at the inner side end edge in the circumferential direction of the half bearing, so that the crush relief grooves communicate with the axial groove.

According to the configuration as above, the lubrication oil injected into a relief gap from the discharge port of the crankpin surface is broadly dispersed not only in the circumferential direction but also in a width direction (axial direction), and therefore, the foreign matters mixed into the lubrication oil are also dispersed in the width direction. The foreign matters are guided in the crush relief grooves together with the lubrication oil, and are fed into the axial groove. Finally, the foreign matters are discharged to the outside from both end portions of the axial groove, together with the lubrication oil.

BRIEF DESCRIPTION OF THE SEVERAL VIEWS OF THE DRAWING

FIGS. 9A and 9B are operational views explaining an operation of the half bearing of the embodiment in a state before injection of lubrication oil, while FIG. 9A is a view seen from an inner side, and FIG. 9B is a front view;

FIGS. 10A and 10B are operational views explaining the operation of the half bearing of the embodiment in a state after injection of the lubrication oil, while FIG. 10A is a view seen from the inside, and FIG. 10B is a front view;

FIGS. 12A and 12B are operational views explaining operation of a half bearing of the prior art in a state before injection of the lubrication oil, while FIG. 12A is a view seen from an inner side, and FIG. 12B is a front view;

FIGS. 13A and 13B are operational views explaining the operation of the half bearing of the prior art in a state after injection of the lubrication oil, while FIG. 13A is a view seen from the inner side, and FIG. 13B is a front view;

FIGS. 14A and 14B are operational views explaining the difference in operation depending on a length of the crush relief, while FIG. 14A shows a state at a time of start of communication (immediately after injection), and FIG. 14B shows a state in which the discharge port catches up; and FIGS. 15A and 15B are operational views explaining the difference in operation depending on a length of a transitional region, while FIG. 15A shows a front view at the time of start of communication, and FIG. 15B shows a view seen from an inner side.

DETAILED DESCRIPTION OF THE INVENTION

Figure 1:
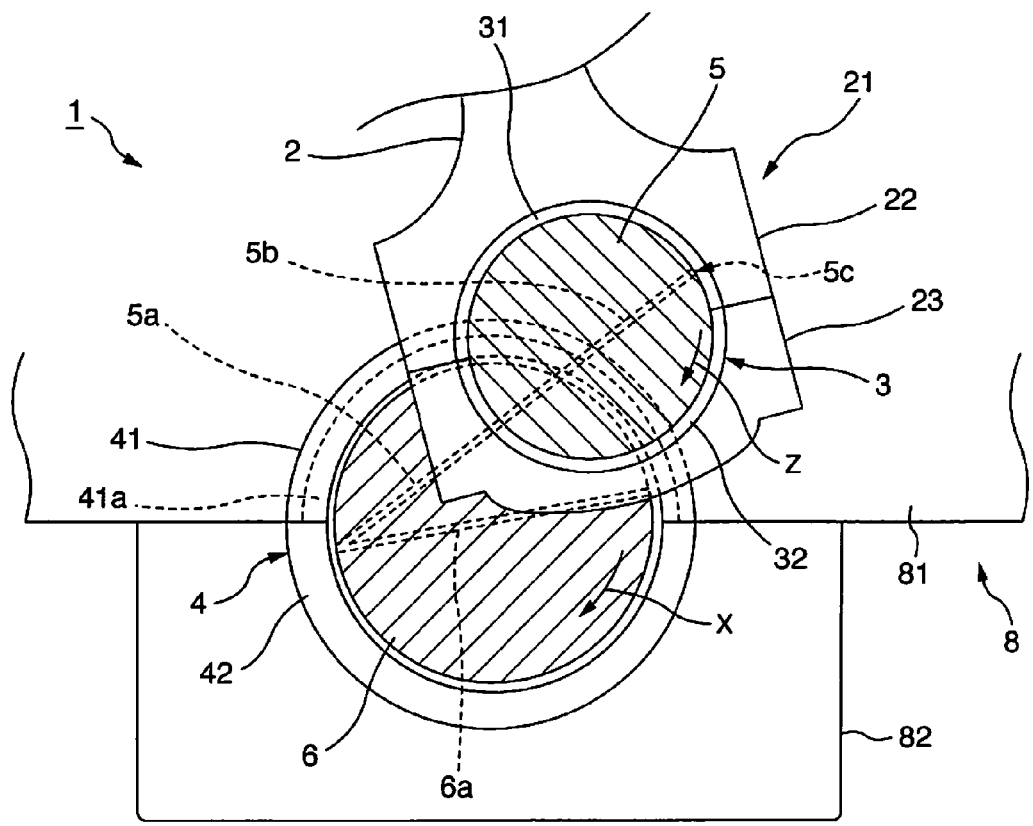
FIG. 1 is a sectional view of a crankshaft of an internal combustion engine that is cut at a journal section and a crankpin section.

Hereinafter, an embodiment of the present invention will be described with reference to the drawings. Note that in order to facilitate understanding, crush reliefs are drawn by being emphasized in the drawings.

Embodiment (Overall Configuration of Bearing Device)

As shown in FIG. 1, a bearing device 1 of the present embodiment includes a journal section 6 that is supported at a lower portion of a cylinder block 8, a crankpin 5 that is formed integrally with the journal section 6 and rotates about the journal section 6, and a connecting rod 2 that transmits reciprocating motion from an internal combustion engine to the crankpin 5. The bearing device 1 further includes a main bearing 4 that rotatably supports the journal section 6, and a connecting rod bearing 3 that rotatably supports the crankpin 5, as sliding bearings that support a crankshaft.

Note that the crankshaft has a plurality of journal sections 6 and a plurality of crankpins 5, but in this case, for convenience of explanation, only one journal section 6 and one crankpin 5 are illustrated and described. In FIG. 1, the positional relationship in the sheet in the depth direction is configured such that the journal section 6 is located on the back side of the sheet, and the crankpin 5 is on a front side.

The journal section 6 is pivotally supported at a cylinder block lower portion 81 of the internal combustion engine via the main bearing 4 composed of a pair of half bearings 41 and 42. In the half bearing 41 located at an upper side in FIG. 1, a lubrication oil groove 41a is formed throughout an entire length of an inner circumferential surface. Further, the journal section 6 has a lubrication oil path 6a that penetrates in a diameter direction, and when the journal section 6 rotates in an arrow X direction, both end openings of the lubrication oil path 6a alternately communicate with the lubrication oil groove 41a of the main bearing 4.

The crankpin 5 is pivotally supported by a large end portion housing 21 (a rod side large end portion housing 22 and a cap side large end portion housing 23) of the connecting rod 2 via the connecting rod bearing 3 that is composed of a pair of half bearings 31 and 32.

As described above, for the main bearing 4, lubrication oil that is discharged by an oil pump is fed into the lubrication oil groove 41a that is formed along the inner circumferential surface of the main bearing 4, through a through-hole formed in a wall of the main bearing 4 from an oil gallery formed in a cylinder block wall.

Further, the first lubrication oil path 6a is formed to penetrate in the diameter direction of the journal section 6, and both end openings of the first lubrication oil path 6a communicate with the lubrication oil groove 41a. A second lubrication oil path 5a that branches from the first lubrication oil path 6a of the journal section 6 to pass through a crank arm section (not illustrated) is formed, and the second lubrication oil path 5a communicates with a third lubrication oil path 5b that is formed to penetrate in a diameter direction of the crankpin 5.

In this manner, the lubrication oil passes through the first lubrication oil path 6a, the second lubrication oil path 5a and the third lubrication oil path 5b and is supplied to a gap formed between the crankpin 5 and the connecting rod bearing 3 from a discharge port 5c at an end portion of the third lubrication oil path 5b.

Figure 4:
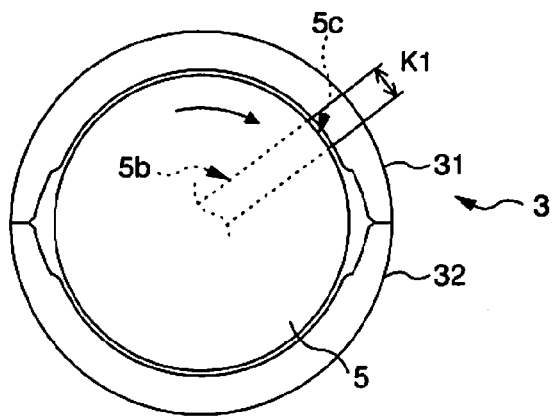
FIG. 4 is a front view of half bearings explaining a discharge port provided in a crankpin.

The discharge port 5c is an opening portion that is provided on a surface of the crankpin 5 to supply the lubrication oil to a gap between the crankpin 5 and the connecting rod bearing 3 as described above, and has a diameter K1 in a circumferential direction on the surface of the crankpin 5 (see FIG. 4).

(Configuration of Half Bearing)

Figure 2:
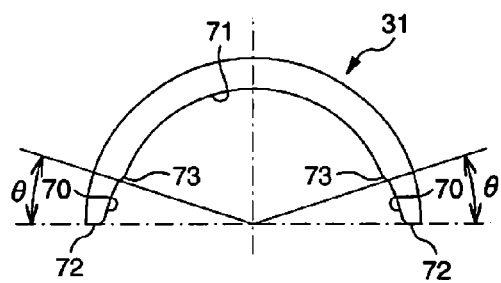
FIG. 2 is a front view of a half bearing of an embodiment.

The connecting rod bearing 3 of the present embodiment is formed by butting end surfaces in a circumferential direction of the pair of half bearings 31 and 32 and combining the half bearings to be in a cylindrical shape as a whole (see FIG. 4). Each half bearing 31 (32) is formed into a semi-cylindrical shape by a bimetal with a thin bearing alloy bonded onto a steel plate as shown in FIG. 2. The half bearing 31 includes a main cylindrical portion 71 formed to include a central portion in the circumferential direction, crush reliefs 70 and 70 formed at both end portions in the circumferential direction, and transitional regions 73 and 73 that are located between the main cylindrical portion 71 and the crush reliefs 70 and 70 and are formed so that wall thicknesses thereof become thinner toward the crush reliefs 70 and 70.

Here, the transitional regions 73 at a front side in a crankpin rotating direction of the half bearings 31 and 32 are essential components in the present invention, but the transitional regions 73 at a rear side are not essential components. However, in the present embodiment, an example including the transitional regions 73 and 73 at both the front side and the rear side is shown. By including the transitional regions 73 and 73 at both sides like this, a worker can be prevented from assembling the half bearing 31 so that the transitional region 73 is located only at the rear side in the rotational direction of the crankpin 5 by mistake. Unlike the embodiment, the crush reliefs 70 and the main cylindrical portions 71 may be formed to connect directly to each other without forming the transitional regions 73 at the rear sides in the rotational direction of the crankpin 5 of the half bearings 31 and 32. Here, "the transitional region 73 at the front side in the rotational direction of the crankpin 5" means a transitional region 73 through which an arbitrary point on the surface of the rotating crankpin 5 passes secondary, among the transitional regions 73 located in the vicinity of both ends, when attention is focused on one single half bearing 31.

The main cylindrical portion 71 has a semi-cylindrical surface occupying most of the inner circumferential surface of the half bearing 31, and the semi-cylindrical surface forms a main sliding surface between the bearing and a counterpart shaft.

Figure 5:
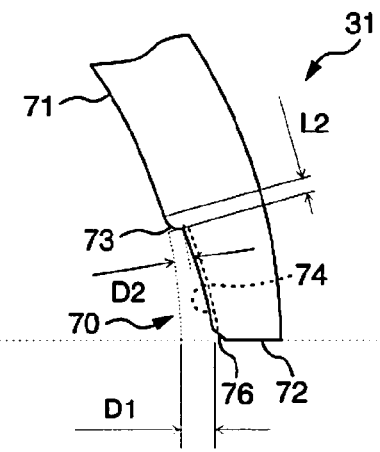
FIG. 5 is an enlarged front view explaining a shape in a vicinity of a crush relief.
Figure 6:
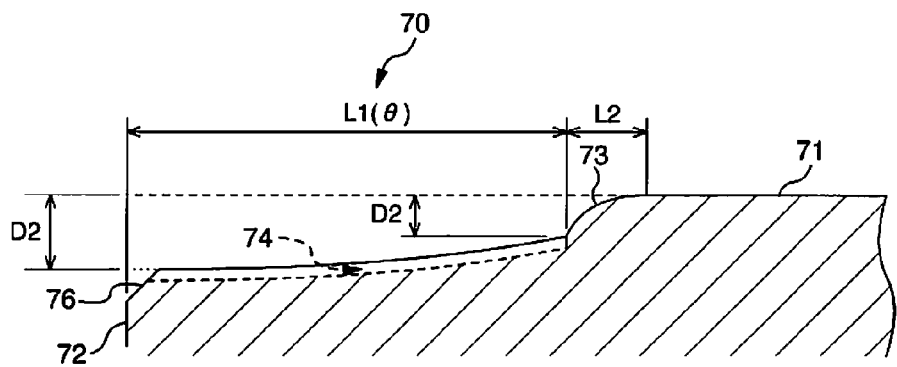
FIG. 6 is a development view explaining specific dimensions by developing a main cylindrical portion into a plane with respect to the shape in the vicinity of the crush relief.

The transitional region 73 with the wall thickness gradually decreasing toward the crush relief 70 is provided adjacently to the main cylindrical portion 71, as shown in FIGS. 5 and 6. In other words, in the transitional region 73, an inclined curved surface (or an inclined plane) is formed to get closer to a counterpart shaft side toward an inner surface of the main cylindrical portion 71 from an inner surface of the crush relief 70.

The transitional region 73 seen from the axial direction of the half bearing 31 is constituted by an inward protruded curved surface that is protruded inward in a radial direction of the half bearing 31. Namely, an inclination of the inclined curved surface of the transitional region 73 to a virtual inner circumferential surface of the half bearing 31 seen from the axial direction of the half bearing 31 is the largest at a position where the transitional region 73 is connected to the crush relief 70, and is the smallest at a position where the transitional region 73 is connected to the main cylindrical portion 71, and the transitional region 73 is smoothly connected to the main cylindrical portion 71.

Note that an inner surface shape of the transitional region 73 only have to have a shape such that at the moment when the discharge port 5c for the lubrication oil on the surface of the crankpin 5 communicates with the transitional region 73, an injection flow (rapid flow) of the lubrication oil that is the lubrication oil in the lubrication oil path 5b flowing into a relief gap (gap formed by the transitional region 73 and the crush relief surface, and the surface of the crankpin 5) is dispersed in a width direction of the half bearing 31. Accordingly, the inner surface shape does not necessarily have to be the shape having an inward protruded curved surface, and may be, for example, a shape having an outward protruded curved surface that is protruded to an outer diameter side, or may be an S-shaped composite curved surface having an outward protruded curved surface at a side near the crush relief 70 and an inward protruded curved surface at a side far from the crush relief 70. Further, the transitional region 73 may be a flat surface instead of a curved surface.

A length in the circumferential direction of the transitional region 73 of the present embodiment is smaller than the diameter K1 of the discharge port 5c for the lubrication oil on the surface of the crankpin 5. As will be described later, the length in the circumferential direction of the transitional region 73 is preferably in a range of 5 to 75% of the diameter K1 of the discharge port 5c, and more preferably in a range of 10 to 60% of the diameter K1 of the discharge port 5c.

The crush relief 70 is a wall thickness-reduced region that is formed in a region adjacent to an end surface 72 (see FIG. 5) in the circumferential direction of the half bearing 31 so that the wall thickness thereof becomes thinner than that of the main cylindrical portion 71. The crush relief 70 is provided with the objective of absorbing positional displacement and deformation of the butting end surfaces (end surfaces 72 in the circumferential direction) in a state in which the pair of half bearings 31 and 32 are assembled to the connecting rod 2.

The crush relief 70 of the present embodiment is formed so that a depth D1 at the position of the end surface 72 is larger than a depth D2 at a position connecting to the transitional region 73, as shown in FIGS. 5 and 6. Here, the depth of the crush relief 70 means a distance from a virtual inner circumferential surface that is the inner circumferential surface of the main cylindrical portion 71 extended on the crush relief 70 to the surface of the crush relief 70.

Further, the crush relief 70 of the present embodiment is constituted by an outward protruded curved surface that is protruded outward in the radial direction of the half bearing 31. Namely, when the crush relief 70 is seen from the axial direction of the half bearing 31, an inclination of the inner surface of the crush relief 70 relative to the virtual inner circumferential surface of the half bearing 31 is the largest at the position connecting to the transitional region 73, and is the smallest at the position of the end surface 72 to be substantially parallel with the virtual inner circumferential surface.

Figure 3:
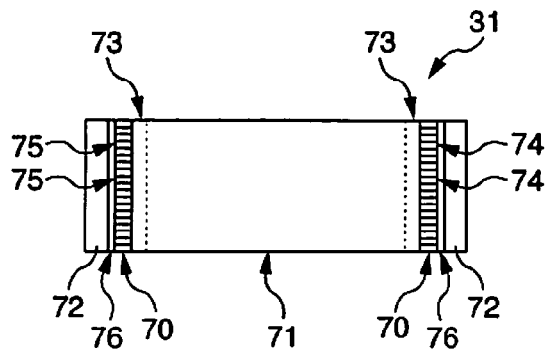
FIG. 3 is a bottom view of the half bearing of the embodiment.

In the crush relief 70, a plurality of crush relief grooves 74 are formed throughout the entire length in the circumferential direction of the inner circumferential surface of the crush relief 70 so as to extend parallel with the circumferential direction of the bearing, as shown in FIG. 3. The plurality of crush relief grooves 74 are disposed in parallel in the width direction of the half bearing 31, and are formed throughout an entire width. Accordingly, on the inner circumferential surface of the crush relief, the plurality of crush relief grooves 74 are formed throughout the entire region and a flat region is not present.

Figure 7:
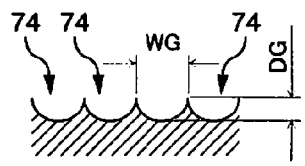
FIG. 7 is a sectional view of crush relief grooves.
Figure 8:
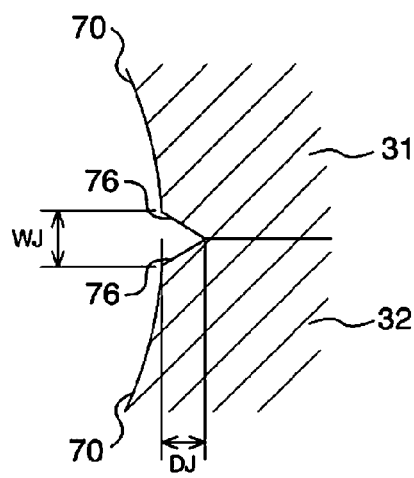
FIG. 8 is a sectional view of an axial groove.

Describing in more detail, the crush relief groove 74 is formed into a circular arc shape (shape in which a circular arc portion is on a rear side) with a predetermined groove width WG and a predetermined groove depth DG, as shown in FIG. 7. In other words, the individual crush relief grooves 74 are U-shaped cut grooves, are provided side by side at constant intervals (WG) in the width direction, and form a sectional shape of saw teeth or a shallow comb as a whole. Here, the groove width WG means a distance between vertexes of adjacent crest portions in the width direction of the half bearing 31, and the groove depth DG refers to a distance from the vertex to a bottom of a trough portion in the vertical direction to the inner circumferential surface. More specifically, the crush relief groove 74 preferably has the groove width WG of 0.05 to 0.5 mm, and the groove depth DG of 1 to 20 μm.

In the crush relief 70 of the present invention, an axial groove 76 that continuously extends in the axial direction of the half bearing 31 is formed at an inner side end edge in the circumferential direction of the half bearing 31 as shown in FIGS. 3, 5, 6 and 8. Namely, the axial groove 76 is formed along an inner edge of the circumferential end surfaces 72 that abut on each other, and throughout the entire width length in the axial direction of the sliding bearing in a state in which the pair of half bearings 31 and 32 are combined into a cylindrical shape.

More specifically, the axial groove 76 preferably has a groove width WJ of 0.3 to 2 mm in the combined state, and a groove depth DG of 0.1 to 1 mm. The dimensions of the axial groove 76 to be a discharge path for foreign matters can be determined taking account of the size of the foreign matters mixed in the lubricant oil, and is not influenced by the size of the bearing. Note that in FIG. 8, as the axial groove 76, the groove with a V-shaped section is shown, but the sectional shape is not limited thereto as long as discharge of foreign matters is enabled.

The axial groove 76 is formed to be deeper than the crush relief groove 74. Therefore, an opening at the circumferential end portion of the crush relief groove 74 is opened to an inner surface (recessed portion) of the axial groove 76. In that way, the lubrication oil and the foreign matters that flow by being guided by an inner surface recessed portion of the crush relief groove 74 directly advance into the axial groove 76, and therefore, an oil flow in the axial direction is easily formed inside the axial groove 76. Accordingly, the foreign matters that advance into the axial groove 76 together with the lubrication oil are easily discharged to the outside of the bearing.

Next, with reference to FIG. 6, specific dimensions of the crush relief 70 and the transitional region 73 will be described. FIG. 6 is a development view in which the inner circumferential surface of the main cylindrical portion 71 is developed into a plane (straight line in the section).

Figure 14A:
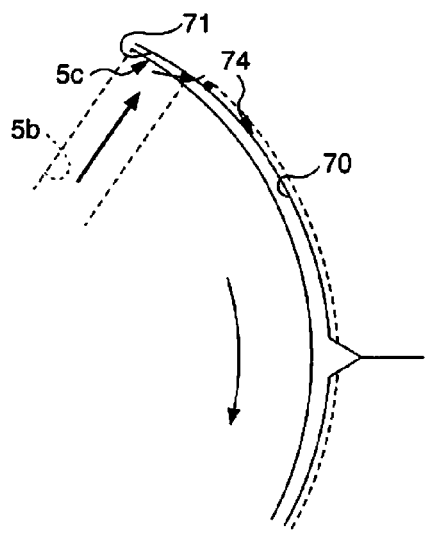
Figure 14B:
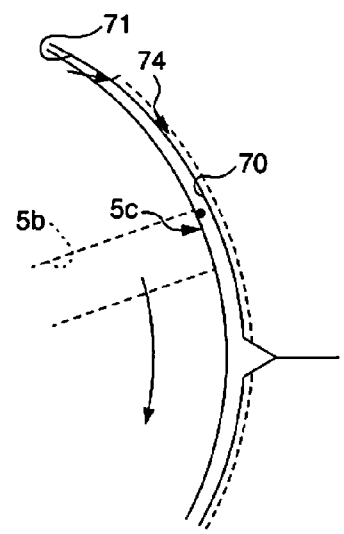

The depth D1 of the crush relief 70 can be similar to the depth of the conventional crush relief. For example, the depth D1 is approximately 0.01 to 0.05 mm in the case of the bearing for a compact internal combustion engine for a passenger car, while it may differ depending on the specifications of the internal combustion engine. Further, a length L1 of the crush relief 70 is preferably set at a length of 3 mm or more at the minimum in order to absorb the positional displacement and deformation of the butting end surfaces (end surfaces 72 in the circumferential direction) of the pair of half bearings 31 and 32. However, the crush relief 70 is preferably formed within a range of a maximum circumferential angle θ of less than 20° from the circumferential end portion of the half bearing to the circumferential central portion side (see FIGS. 2, 14A and 14B). This is because if the length L1 is excessively long, the discharge port 5c catches up with a foreign matter before the foreign matter reaches the axial groove 76, and the foreign matter contacts the edge portion at the rear side in the crankpin 5 rotational direction of the discharge port 5c, and is dragged by the edge portion to damage the inner circumferential surface of the other half bearing 32 easily. Note that when the transitional region 73 is not formed at the rear side in the rotational direction of the crankpin 5 of the half bearing 31, the crush relief 70 is formed to have the length L1 (θ) and the depth D1 of the crush relief similar to the present invention.

The depth D2 of the crush relief 70 at a position connecting to the transitional region 73 can be set at 0.005 to 0.030 mm. If the depth D2 is within this range, a sufficient gap is formed between the crush relief and the crankpin 5 surface in the circumferential end portion 72 of the crush relief 70, and therefore, the injection flow of the lubrication oil at the moment when the discharge port 5c of the internal lubrication oil path 5b of the crankpin 5 communicates with the transitional region 73 can be dispersed also in the width direction of the bearing in the surface of the crush relief 70 (see FIGS. 10A and 10B). Accordingly, the foreign matters inside the oil path can be prevented from being fed to a forward side in the rotational direction of the crankpin 5 in a concentrated manner (see FIG. 12A).

More specifically, when the depth D2 is less than 0.005 mm, the gap from the crankpin 5 surface in the circumferential end portion 72 of the crush relief 70 cannot be sufficiently formed, and therefore, the injection flow of the oil at the moment when the discharge port 5c of the internal lubrication oil path 5b of the crankpin 5 communicates with the transitional region 73 is difficult to disperse in the width direction of the bearing in the surface of the crush relief 70. In contrast with this, when the depth D2 exceeds 0.030 mm, the gap of the crush relief 70 in the end portion in the width direction of the half bearing 31 (the gap sandwiched by the inner surface of the crush relief 70 and the virtual inner circumferential surface) becomes large, and therefore, the leakage amount of the lubrication oil to the outside from both the end portions in the bearing width direction of the half bearing 31 also becomes large.

A circumferential length L2 of the transitional region 73 is preferably a length corresponding to 5% to 75% of the circumferential length K1 of the discharge port 5c of the internal lubrication oil path 5b of the surface of the crankpin 5. The circumferential length K1 of the discharge port 5c of the surface of the crankpin 5 is not limited as long as the effect of the present invention is obtained, although it differs depending on the specifications of the internal combustion engine. For example, in the case of a compact internal combustion engine, the length of the discharge port 5c of the internal lubrication oil path 5b of the surface of the crankpin 5 is approximately 4 to 6 mm.

When the circumferential length L2 of the transitional region 73 is less than 5% of the length of the circumferential length K1 of the discharge port 5c of the surface of the crankpin 5, the gap which is needed to disperse the injection flow of the lubrication oil from the discharge port 5c cannot be secured.

Figure 15A:
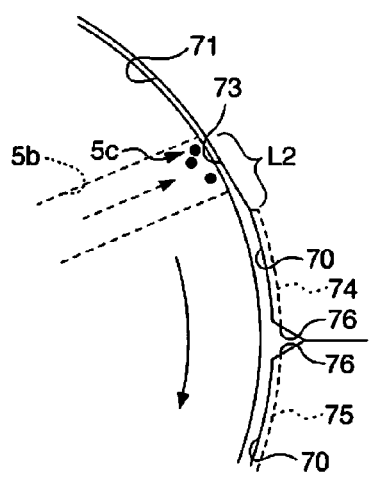
Figure 15B:
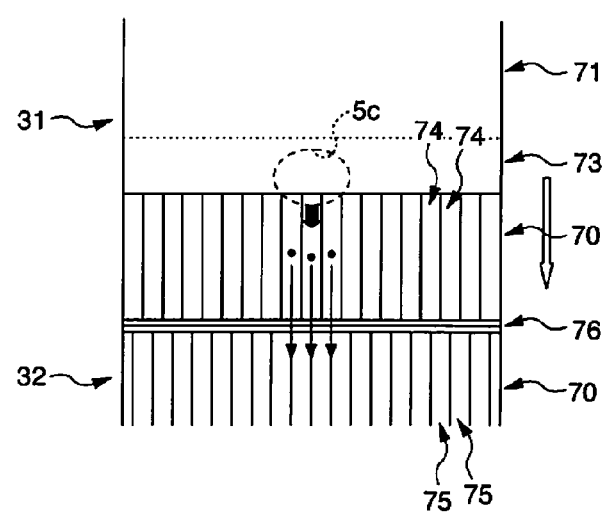

In contrast with this, when the circumferential length L2 of the transitional region 73 exceeds 75% of the length of the circumferential length K1 of the discharge port 5c of the surface of the crankpin 5, if the depth D2 of the transitional region 73 is set at 5 to 30 μm as described above, the inclination of the curved surface of the transitional region 73 relative to the virtual inner circumferential surface of the half bearing 31 seen from the axial direction of the half bearing 31 becomes small to be closely analogous to the virtual inner circumferential surface, and therefore, the gap (gap between the crankpin surface and the curved surface of the transitional region) becomes too narrow. In that case, even if the discharge port 5c of the surface of the crankpin 5 communicates with the transitional region 73, the lubrication oil and the foreign matters inside the oil path are difficult to discharge into the gap. Note that the length L2 of the transitional region 73 is more preferably set at a length of 10 to 60% of the circumferential length K1 of the discharge port 5c of the surface of the crankpin 5 (see FIGS. 15A and 15B).

Note that the shapes of the main cylindrical portion 71, the crush relief 70 and the transitional region 73 described above are measurable by an ordinary shape measuring device, for example, by a roundness measuring device. Namely, the shape of the inner surface of the bearing can be continuously measured in the circumferential direction in a state in which the bearing is assembled to the connecting rod, or a housing similar thereto.

(Operation)

Next, with reference to FIGS. 9 to 15, operation of the half bearing 31 of the present embodiment will be described.

An oil feeding mechanism for the lubrication oil in an internal combustion engine is configured such that the lubrication oil discharged by the oil pump is supplied to the inner circumferential surface of the main bearing 4 that supports the crankshaft, and is further supplied through the internal lubrication oil paths 6a, 5a and 5b of the crankshaft to the inner circumferential surface of the connecting rod bearing 3 that rotatably supports the crankpin 5 that connects the connecting rod 2 and the crankshaft (see FIG. 1).

Figure 9A:
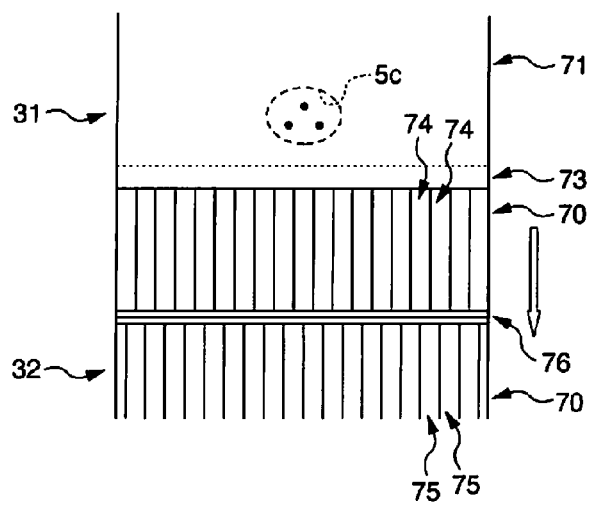
Figure 9B:
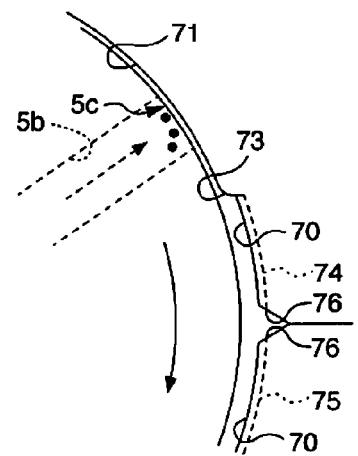

As shown in FIGS. 9A and 9B, while the discharge port 5c for the lubrication oil of the crankpin 5 surface is located at the main cylindrical surface of the half bearing 31, the gap located between the surface of the crankpin 5 and the main cylindrical surface of the half bearing 31 is narrow. Therefore, the amount of the lubrication oil that flows out from the discharge port 5c is small, and the pressure of the lubrication oil in the lubrication oil path 5b is in a high state. The foreign matters that cannot advance into the gap between the surface of the crankpin 5 and the main cylindrical surface of the half bearing 31 remain in the lubrication oil path 5b.

Figure 10A:
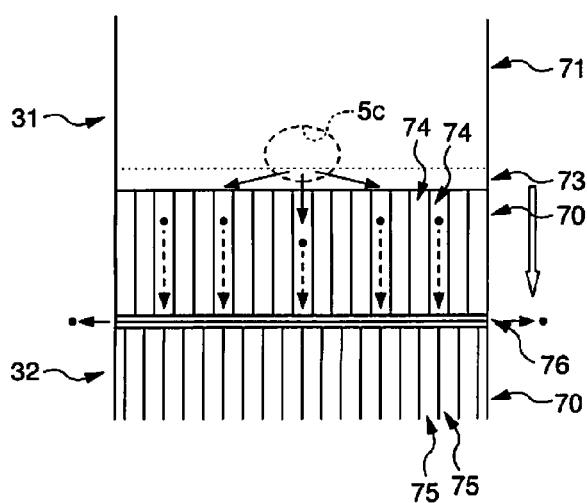
Figure 10B:
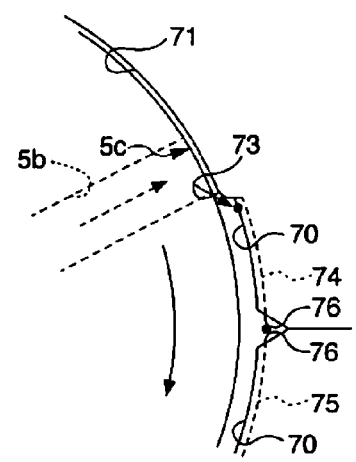

As shown in FIGS. 10A and 10B, at the moment when the discharge port 5c of the lubrication oil path 5b of the surface of the crankpin 5 and the transitional region 73 start to communicate with each other, the injection flow of the lubrication oil is instantly formed from the lubrication oil path 5b to the relief gap due to the difference between the pressure of the lubrication oil inside the lubrication oil path 5b and the pressure of the lubrication oil in the gap (relief gap) formed by the crush relief 70 and the transitional region 73, and the surface of the crankpin 5. Since the half bearing 31 of the present invention has the transitional region 73, the injection flow (rapid flow) of the lubrication oil flows so as to be dispersed in the bearing width direction of the relief gap, and therefore, the foreign matters mixed in the lubrication oil are also discharged so as to be dispersed to both sides in the bearing width direction of the relief gap. The discharged foreign matters are guided to the crush relief grooves 74 together with the lubrication oil, are fed to the axial groove 76, and are further discharged to the outside from both end portions in the bearing width direction of the axial groove 76 together with the lubrication oil.

Accordingly, in the half bearing 31 of the present invention, the foreign matters are not fed in a concentrated manner to the region where the discharge port 5c of the internal lubrication oil path 5b of the surface of the crankpin 5 passes over the circumferential end portion of the crush relief 70 that is located at the rear side in the crankpin 5 rotational direction of the other half bearing 32, and the problem that the foreign matters are dragged by the edge portion of the discharge port 5c of the internal lubrication oil path 5b of the surface of the crankpin 5 and damage the inner circumferential surface of the main cylindrical portion 71 of the half bearing 32 hardly occurs.

Incidentally, some of the foreign matters that are discharged into the relief gap sometimes pass over the axial groove 76 and enter the relief gap of the other half bearing 32, and therefore, the crush relief grooves 74 and 75 are preferably disposed as follows.

Figure 11:
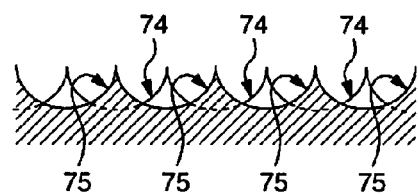
FIG. 11 is an explanatory view explaining a positional relationship of paired circumferential grooves.

The crush relief 70 of the other half bearing 32 that is paired with the one half bearing 31 is provided with a plurality of crush relief grooves 75 that continuously extend in the circumferential direction. As shown in FIG. 11, the plurality of crush relief grooves 74 of the one half bearing of the present embodiment are each displaced by a half of the groove width WG in the width direction with respect to the plurality of crush relief grooves 75 of the other half bearing. Namely, in the butting portions of the circumferential end surfaces of the pair of half bearings 31 and 32 the trough portions (openings of the recessed shape of the crush relief grooves) of the crush relief grooves 74 at one side are disposed to correspond to the crest portions (protruded shapes each formed between the two adjacent circumferential grooves 75) of the crush relief grooves 75 at the other side in connecting positions of the crush relief grooves 74 at one side and the crush relief grooves 75 at the other side (not directly connected since the axial groove 76 is present in reality).

Accordingly, the foreign matters receive resistance at the connecting portions of the crush relief grooves 74 and the crush relief grooves 75. Therefore, the foreign matters flowing in the crush relief grooves 74 of the one half bearing 31 hardly advance into the crush relief grooves 75 of the other half bearing 32, and are easily discharged to the outside of the bearing by the flow of the oil flowing to the end portion sides in the bearing width direction in the axial groove 76.

In the present embodiment, the example in which the plurality of crush relief grooves 74 of the one half bearing 31 are each displaced by a half of the groove width WG in the width direction with respect to the plurality of crush relief grooves 75 of the other half bearing 32 is shown, but the present invention is not limited thereto. The plurality of crush relief grooves 74 may be displaced within the range between exceeding zero and less than the groove width WG in the width direction with respect to the plurality of circumferential grooves 75 of the other half bearing 32. In other words, the crush relief groove 74 at one side and the crush relief groove 75 at the other side can be disposed so that the positions of the central portions of the respective groove widths are displaced by an amount within the range between exceeding at least zero and less than the groove width WG at the maximum in the width direction of the half bearing 31, at the connecting position. Note that the crush relief grooves 74 and the crush relief grooves 75 may be aligned with one another, although the discharge performance of the foreign matters is slightly unfavorable.

Here, for comparison with the operation of the present invention, the operation of the prior art will be described with use of FIGS. 12A, 12B, 13A and 13B. As described above, while the discharge port 5c for the lubrication oil at the surface of the crankpin 5 is located on a main cylindrical surface of a half bearing 131, the gap between the surface of the crankpin 5 and the main cylindrical surface of the half bearing 131 is narrow. Therefore, the amount of the lubrication oil that flows out from the discharge port 5c is small, and the pressure of the lubrication oil in the lubrication oil path 5b is in a high state. The foreign matters that cannot advance into the gap between the surface of the crankpin 5 and the main cylindrical surface of the half bearing 131 remain in the lubrication oil path 5b.

Figure 12A:
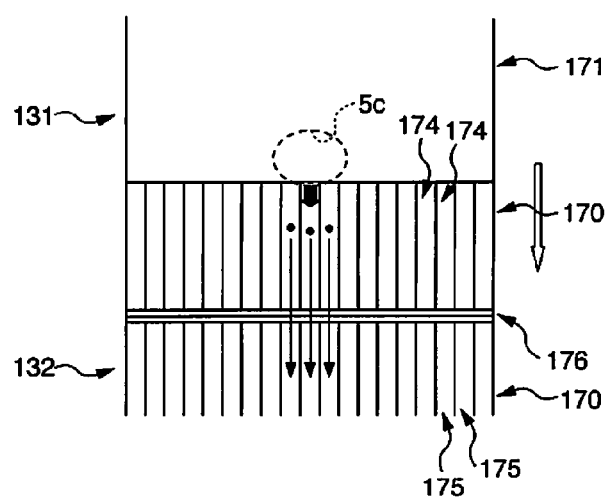
Figure 12B:
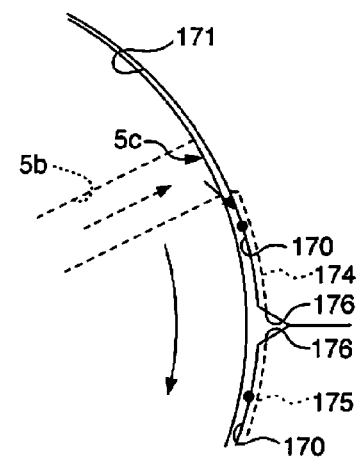

As shown in FIGS. 12A and 12B, at the moment when the discharge port 5c for the lubrication oil of the surface of the crankpin 5 and a crush relief 170 start to communicate with each other, an injection flow of oil to the relief gap side from the lubrication oil path 5b is instantly formed due to the difference between the pressure of the lubrication oil inside the lubrication oil path 5b and the pressure of the lubrication oil in a gap (relief gap) between the crush relief 170 and the surface of the crankpin 5.

On that occasion, the injection flow mainly flows only into crush relief grooves 174 that communicate with the discharge port 5c for the lubrication oil, since the relief gap in the region at the circumferential end portion of the crush relief 170 is narrow. Therefore, the injection flow of the lubrication oil becomes extremely strong. Accordingly, the foreign matters also mainly flow only into the crush relief grooves 174 that communicate with the discharge port 5c for the lubrication oil by the injection flow.

Subsequently, the foreign matters that flow into the crush relief grooves 174 move straight forward in the crush relief grooves 174 by the strong injection flow of the lubrication oil, pass over an axial groove 176 by the inertial force, advance into crush relief grooves 175 of the other half bearing 132, and are fed to an area where the discharge port 5c for the lubrication oil passes, in a region adjacent to the main cylindrical surface, in a concentrated manner.

Figure 13A:
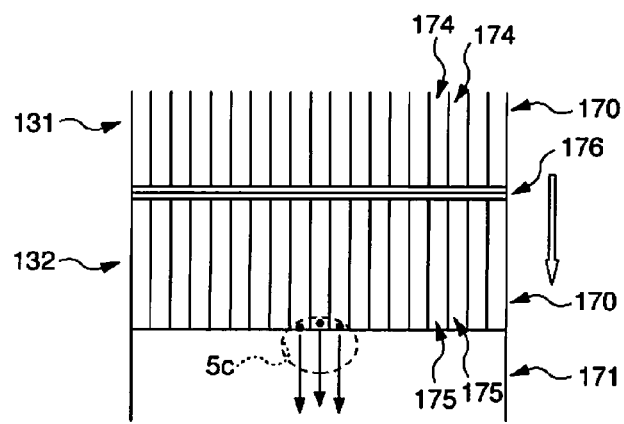
Figure 13B:
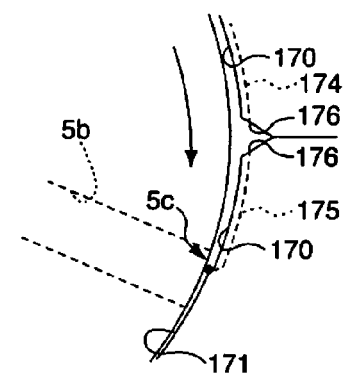

Then, as shown in FIGS. 13A and 13B, the foreign matters that move straight ahead are dragged by the inner side surface (edge portion) at the rear side in the rotational direction of the discharge port 5c for the lubrication oil of the crankpin 5 that passes in the region later, where the gap is small, and damage the inner circumferential surface of the other half bearing 132, because the relief gap in the crush relief 170 of the other half bearing 132 becomes gradually smaller toward the front side in the rotational direction of the crankpin 5.

(Effects)

Next, effects of the connecting rod bearing 3 of the present embodiment will be listed and described.

(1) The pair of half bearings 31 and 32 that constitute the connecting rod bearing 3 of the present embodiment each have the main cylindrical portion 71, the crush reliefs 70 and the transitional regions 73. The plurality of crush relief grooves 74 that continuously extend in the circumferential direction are formed in the crush relief 70, while the axial groove 76 that continuously extend in the axial direction is formed at the inner side end edge in the circumferential direction of the half bearing 31, so that the crush relief grooves 74 communicate with the axial groove.

According to the configuration as above, the lubrication oil that is injected into the relief gap from the discharge port 5c of the surface of the crankpin 5 is dispersed broadly not only in the circumferential direction but also in the width direction (axial direction), and therefore, the foreign matters that are mixed in the lubrication oil are also dispersed in the width direction. Subsequently, the foreign maters are guided inside the crush relief grooves 74 together with the lubrication oil, and are fed into the axial groove 76. Finally, the foreign matters are discharged together with the lubrication oil to the outside from both end portions of the axial groove. Accordingly, the connecting rod bearing 3 excellent in dischargeability of the foreign matters that are mixed in the lubrication oil while suppressing the leakage amount of the lubrication oil is provided.

(2) Since the length L2 in the circumferential direction of the transitional region 73 is 5 to 75% of the diameter K1 of the discharge port 5c of the surface of the crankpin 5, the injection flow of the lubrication oil is easily dispersed, and the foreign matters are easily discharged.

(3) Since the length L2 in the circumferential direction of the transitional region 73 is 10 to 60% of the diameter K1 of the discharge port 5c of the surface of the crankpin 5, the injection flow of the lubrication oil is more easily dispersed, and the foreign matters are more easily discharged.

(4) Since the axial groove 76 is formed to be deeper than the crush relief groove 74, the lubrication oil and the foreign matters easily flow into the axial groove 76 from the crush relief grooves 74.

(5) The crush relief groove 74 is formed to have a depth DG of 1 to 20 µm, and a width WG of 0.05 to 0.5 mm, whereby the holding performance of the lubrication oil that flows into the crush relief groove 74 can be enhanced, and the leakage amount can be suppressed.

(6) The axial groove 76 is formed to have a depth DJ of 0.1 to 1 mm, and a width WJ of 0.3 to 2.0 mm, whereby the lubrication oil and the foreign matters that flow therein from the crush relief groove 74 are easily discharged to the outside from the end portion of the axial groove 76.

(7) The crush relief 70 is formed in the range of the central angle of less than 20° from the circumferential end portion of the half bearing 31 toward the circumferential central portion, and thereby the discharge port 5c hardly catches up with the foreign matters before the foreign matters reach the axial groove 76. Accordingly, the phenomenon hardly occurs, in which the foreign matters are dragged by the edge portion of the discharge port 5c and damage the inner circumferential surface of the half bearing 32.

(8) The crush relief grooves 74 of the one half bearing 31 of the pair of half bearings 31 and 32 are displaced in the axial direction by more than zero at the minimum and less than the groove width WG of the crush relief groove 74 at the maximum, with respect to the crush relief grooves 75 of the other half bearing 32. Therefore, the foreign matters meet with resistance in the connecting positions of the crush relief grooves 74 and the crush relief grooves 75, hardly advance into the crush relief grooves 75 of the other half bearing 32, and are easily discharged to the outside of the bearing.

The embodiment of the present invention is described in detail above with reference to the drawings, but the specific configuration is not limited to the embodiment, and design changes without departing from the gist of the present invention are included in the present invention.

For example, in the embodiment, the case in which only the crush relief 70 is provided with the circumferential grooves (crush relief grooves 74) is described, but the main cylindrical surface may be provided with the circumferential grooves. Further, the transitional region 73 may be provided with the circumferential grooves, although the dispersibility of the lubrication oil and the foreign matters is less favorable.

The invention claimed is:

1. A connecting rod bearing for supporting a crankpin of an internal combustion engine, the crankpin having a discharge port on its surface for supplying lubrication oil to a gap between the crankpin and the connecting rod bearing, the connecting rod bearing comprising a pair of half bearings, wherein
  the half bearing comprises a main cylindrical portion including a central portion of the half bearing in a circumferential direction, crush reliefs formed at both end portions of the half bearing in the circumferential direction so that the thickness of walls of the end portions is smaller than that of a wall of the main cylindrical portion, and a transitional region formed between at least the crush relief on a front side in a rotational direction of the crankpin and the main cylindrical portion so that the thickness of a wall of the transition region decreases toward the crush relief,
  a plurality of crush relief grooves are formed in the crush relief to continuously extend in the circumferential direction, and an axial groove is formed at an inner side end edge of the half bearing in the circumferential direction to continuously extending in an axial direction so that the crush relief grooves communicate with the axial groove, and
  a depth of the crush relief at a position connecting to the transitional region is between 0.005 to 0.030 μm.

2. The connecting rod bearing according to claim 1, wherein the length of the transitional region in a circumferential direction is 5% to 75% of a diameter of the discharge port on the crankpin surface.

3. The connecting rod bearing according to claim 2, wherein the length of the transitional region in the circumferential direction is 10% to 60% of the diameter of the discharge port on the crankpin surface.

4. The connecting rod bearing according to claim 1, wherein the axial groove is formed to be deeper than the crush relief grooves.

5. The connecting rod bearing according to claim 1, wherein each crush relief grooves is formed to be 1 μm to 20 μm in depth, and 0.05 mm to 0.5 mm in width.

6. The connecting rod bearing according to claim 1, wherein the axial groove is formed to be 0.1 to 1 mm in depth and 0.3 to 2.0 mm in width.

7. The connecting rod bearing according to claim 1, wherein the crush relief is formed in a range of a central angle of less than 20° from a circumferential end of the half bearing toward the circumferential central portion.

8. The connecting rod bearing according to claim 1, wherein an amount of axial displacement between the crush relief grooves of a first half bearing and the crush relief grooves of a second half bearing is greater than zero and less than a width of a given crush relief groove, and the first half bearing and the second half bearing are among the pair of half bearings.

* * * * *